(12) United States Patent
Kang et al.

(10) Patent No.: US 8,089,706 B2
(45) Date of Patent: Jan. 3, 2012

(54) FIXED-FOCUS LENS

(75) Inventors: Yi-Hao Kang, Hsinchu (TW); Yuan-Hung Su, Hsinch (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/968,549

(22) Filed: Dec. 15, 2010

(65) Prior Publication Data

US 2011/0292515 A1 Dec. 1, 2011

(30) Foreign Application Priority Data

Jun. 1, 2010 (CN) .................................. 099117587

(51) Int. Cl.
*G02B 17/00* (2006.01)
(52) U.S. Cl. ........ 359/727; 359/645; 359/646; 359/661; 359/726; 359/728; 359/740; 359/793
(58) Field of Classification Search .................. 359/645, 359/646, 661, 726–728, 740, 793
See application file for complete search history.

(56) References Cited

U.S. PATENT DOCUMENTS

| | | | |
|---|---|---|---|
| 4,427,274 A | 1/1984 | Pund et al. | |
| 5,477,394 A | 12/1995 | Shibazaki | |
| 6,513,935 B2 | 2/2003 | Ogawa | |
| 6,631,994 B2 | 10/2003 | Suzuki et al. | |
| 6,690,517 B2 | 2/2004 | Ohzawa et al. | |
| 6,984,044 B2 | 1/2006 | Kurioka et al. | |
| 6,989,936 B2 | 1/2006 | Hatakeyama | |
| 6,994,442 B2 | 2/2006 | Kurematsu et al. | |
| 7,009,765 B2 | 3/2006 | Gohman | |
| 7,075,727 B2 | 7/2006 | Jeon et al. | |
| 7,175,287 B2 | 2/2007 | Gohman | |
| 7,370,977 B2 | 5/2008 | Lee | |
| 7,586,687 B2 | 9/2009 | Yoshikawa et al. | |
| 2007/0184368 A1 | 8/2007 | Nishikawa et al. | |
| 2009/0231555 A1 | 9/2009 | Nagarekawa et al. | |
| 2010/0232038 A1* | 9/2010 | Kang et al. ..................... | 359/717 |
| 2011/0002051 A1* | 1/2011 | Hsu et al. ....................... | 359/717 |

FOREIGN PATENT DOCUMENTS

TW    200914873    4/2009

* cited by examiner

*Primary Examiner* — Evelyn A. Lester
(74) *Attorney, Agent, or Firm* — J.C. Patents

(57) ABSTRACT

A fixed-focus lens disposed between a magnified side and a minified side. The fixed-focus lens has an optical axis and includes a reflective system and a refractive system. The reflective system includes a reflection mirror with a negative refractive power. The refractive system is disposed between the reflection mirror and the minified side and includes a first lens group and a second lens group. The first lens group has a positive refractive power. The second lens group is disposed between the first lens group and the minified side, and has a positive refractive power. The fixed-focus lens satisfies $F/H>0.23$, where F is an effective focal length and H is an image height.

18 Claims, 5 Drawing Sheets

FIXED-FOCUS LENS

CROSS-REFERENCE TO RELATED APPLICATION

This application claims the priority benefit of Taiwan application serial no. 99117587, filed on Jun. 1, 2010. The entirety of the above-mentioned patent application is hereby incorporated by reference herein and made a part of this specification.

BACKGROUND OF THE INVENTION

1. Field of the Invention

The invention generally relates to a projection lens, and more particularly, to a fixed-focus lens.

2. Description of Related Art

Usually, if a projector is used to project an image to a larger screen, a longer projection distance is required. Contrarily, if a projector is used to project an image with a shorter projection distance, a specific wide-angle lens is required to shorten the distance between the projection screen and the projector.

In the design of a wide-angle lens, aberration is a difficult issue a designer needs to be confronted with. In order to reduce the aberration, a designer often disposes a reflection mirror to shorten the focal length and uses more lenses, for example, as shown by U.S. Pat. No. 7,009,765 and No. 7,175,287. In U.S. Pat. No. 7,009,765, the designer uses 16 lenses and a reflection mirror, while in U.S. Pat. No. 7,175,287, the designer uses 18 lenses, two reflection mirrors and a component with a bent optical path.

On the other hand, a designer can adopt a plurality of reflection mirrors to shorten the projection distance, as shown by U.S. Pat. No. 5,477,394, No. 6,994,442, No. 6,989,936, No. 6,690,517 and No. 6,984,044. However, the increasing reflection mirrors would increase the production cost and assembly difficulty.

In more details, U.S. Pat. No. 5,477,394 discloses a small lens structure, wherein the distance between a light valve to the imaging plane is shorter. The above-mentioned structure is able to converge the light reflected by the light valve at the primary focus of an ellipse reflection mirror, and then, the light is transmitted to the secondary focus of a parabola reflection mirror and a projection lens. In addition, U.S. Pat. No. 5,495,306 also provides a similar lens structure. In U.S. Pat. No. 6,994,442, the lens structure includes a plurality of reflection mirrors with aspheric curve surfaces.

U.S. Pat. No. 6,690,517 discloses an optical system, which includes a reflection lens group, a reflection mirror perpendicular to the optical axis and a lens set. The reflection lens group includes an aperture and the lens set includes at least a refractive surface with a negative refractive power. In U.S. Pat. No. 6,989,936, the designer provides a variable optical system, which includes a first optical component and a second optical component. The first optical component has a reflective surface and the second optical component, in comparison with the first optical component, contributes more to reduce the Seidel aberration.

Besides, a fixed-focus lens is disclosed, which includes a curved reflection mirror, a first lens group and a second lens group, wherein the first lens group includes an aspheric lens. Taiwan Patent Publication No. 200914873 discloses an optical projection system, which includes an aspheric lens, wherein the summation of the distortion coefficients of the Seidel aberration of the two surfaces in the above-mentioned aspheric lens is positive and greater than 0.5.

U.S. Pat. No. 4,427,274 discloses an optical system which includes a concave reflection mirror and a wide-angle lens. The concave reflection mirror is suitable for an aperture and the wide-angle lens is disposed along the optical axis of reflection mirror. U.S. Pat. No. 6,631,994 discloses an optical system able to correct the pillow-shaped distortion. In addition, U.S. Pat. No. 6,984,044 and No. 7,075,727 respectively disclose a projection system able to reduce the distortion.

Besides, U.S. Pat. No. 7,370,977, No. 7,586,687, No. 6,513,935, US Patent Application No. 20070184368 and No. 20090231555 also disclose several technologies related to the projection lens.

It can be seen from the depiction above that how to design a lens which is able to take a balance consideration between the lower production cost and the better imaging quality has become a significant developing point for the related developers.

SUMMARY OF THE INVENTION

Accordingly, the invention is directed to a fixed-focus lens advantageous both in lower cost and better optical characteristic.

Additional aspects and advantages of the invention are set forth in the description of the techniques disclosed in the invention.

To achieve one of, a part of or all of the above-mentioned advantages, or to achieve other advantages, an embodiment of the invention provides a fixed-focus lens suitable to be disposed between a magnified side and a minified side and having an optical axis. The fixed-focus lens includes a reflective system and a refractive system. The reflective system is disposed between a magnified side and a minified side, and includes a reflection mirror with a negative refractive power. The refractive system is disposed between the reflective system and the minified side. The refractive system includes a first lens group and a second lens group. The first lens group has a positive refractive power. The second lens group is disposed between the first lens group and the minified side and has a positive refractive power. The fixed-focus lens satisfies F/H>0.23, where F is an effective focal length and H is an image height.

The embodiment of the invention has at least one of the following advantages or functions. The fixed-focus lens in the embodiment of the invention includes a reflection mirror and the fixed-focus lens satisfies F/H>0.23. The architecture enables the fixed-focus lens having a broader angle of view (AOV), good imaging quality, lower assembly difficulty and lower cost.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
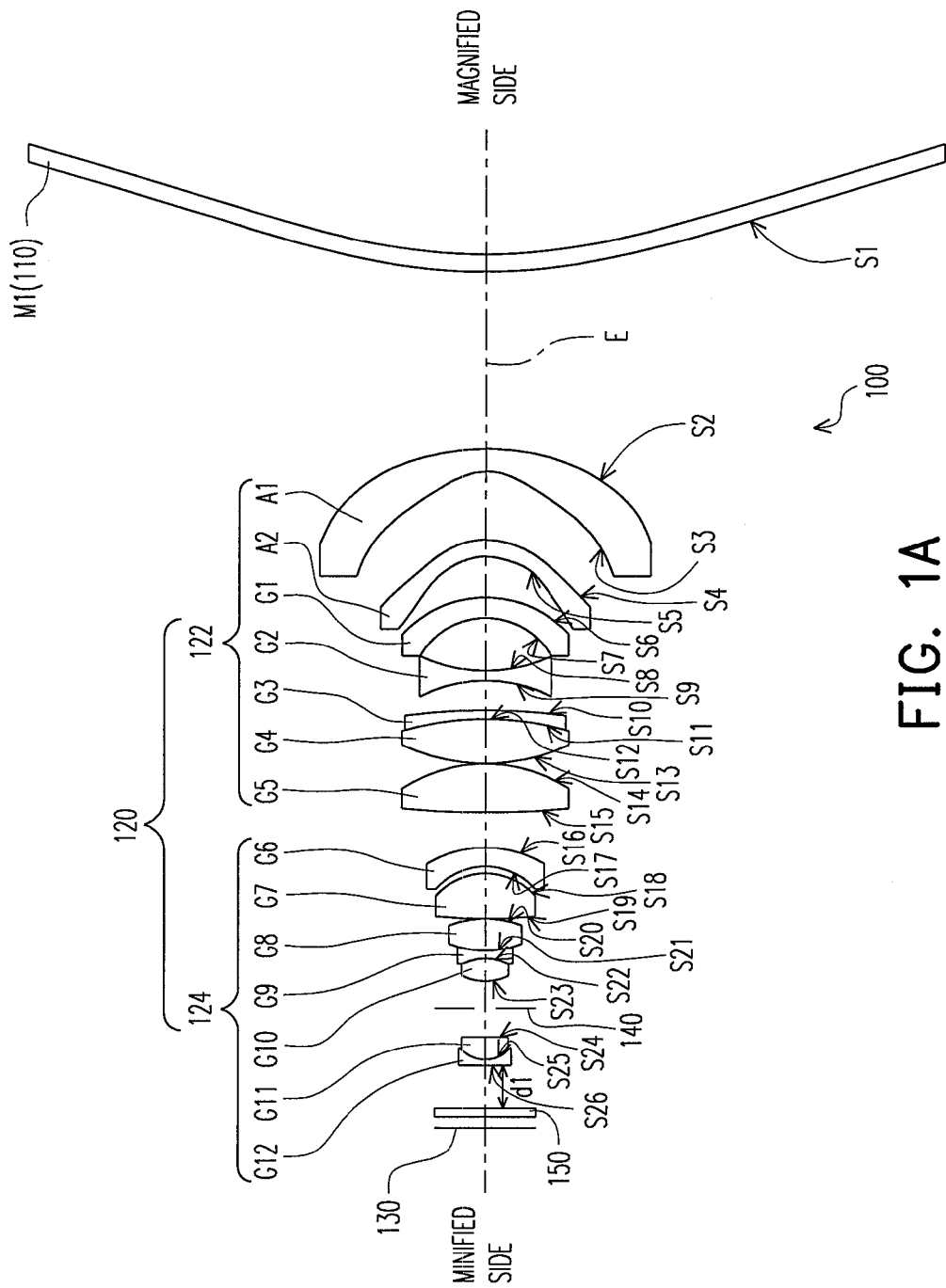
FIG. 1A is a structure diagram of a fixed-focus lens according to an embodiment of the invention.

FIG. 1A is a structure diagram of a fixed-focus lens according to an embodiment of the invention. A projection lens 100 is suitable to be disposed between a magnified side and a minified side. The projection lens 100 has an optical axis E and includes a reflective system 110 and a refractive system 120.

The reflective system 110 is disposed between the magnified side and the minified side and includes a reflection mirror M1, wherein the reflection mirror M1 has a negative refractive power and reflection mirror M1 is, for example, a curved reflection mirror. The refractive system 120 is disposed between the reflective system 110 and the minified side and includes a first lens group 122 and a second lens group 124.

The first lens group 122 has a positive refractive power and includes seven lenses arranged from the magnified side towards the minified side as a first lens A1, a second lens A2, a third lens G1, a fourth lens G2, a fifth lens G3, a sixth lens G4 and a seventh lens G5, wherein the first lens A1, the second lens A2, the third lens G1, the fourth lens G2, the fifth lens G3, the sixth lens G4 and the seventh lens G5 have sequentially negative, negative, negative, negative, negative, positive and positive refractive powers.

The second lens group 124 is disposed between the first lens group 122 and the minified side and has a positive refractive power. The second lens group 124 includes seven lenses arranged from the magnified side towards the minified side as an eighth lens G6, a ninth lens G7, a tenth lens G8, an eleventh lens G9, a twelfth lens G10, a thirteenth lens G11 and a fourteenth lens G12, wherein the eighth lens G6, the ninth lens G7, the tenth lens G8, the eleventh lens G9, the twelfth lens G10, the thirteenth lens G11 and the fourteenth lens G12 have sequentially negative, positive, positive, negative, positive, positive and negative refractive powers.

In the embodiment, the second lens group 124 keeps a fixed position in the projection lens 100, while the first lens group 122 is capable of moving in relation to the second lens group 124 for focusing. In other words, the positions of the second lens group 124 and a light valve 130 keep fixed to remain the relative position between an image and an object to be projected. The first lens group 122 is a focusing lens group suitable to conduct a focus-adjusting compensation for different projection distances. In addition, when a product is going to be shipped out, a designer can appropriately adjust a back-focus distance d1 or the tilt extent of the reflection mirror M1 so as to effectively compensate the manufacturing tolerance and further to reach the focusing effect and reduce the aberration of the frame. In this way, the user can reach the focusing effect by adjusting the first lens group 122. That is to say, when the imaging position needs to be changed, the user can complete the focusing operation by making a relative move between the lens groups. In the embodiment, the projection lens 100 is suitable for a wide-angle lens with short focal length of an electronic white board. In addition, the projection distance is, for example, 46.8 cm-65.5 cm and the size of the projection screen is, for example, 77 inch to 100 inch.

Figure 1B:
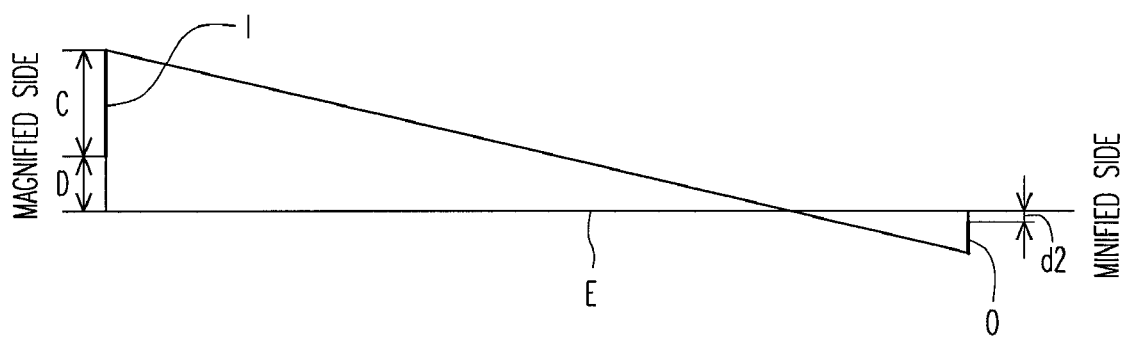
FIG. 1B is an imaging diagram of the fixed-focus lens of FIG. 1A.

FIG. 1B is an imaging diagram of the fixed-focus lens of FIG. 1A. In the embodiment, there is an offset d2 between an object to be projected O and an optical axis E and the projection lens 100 satisfies $(C+D)/C \geq 1$, where C is the length of an image I at the magnified side and D is the distance between the image I and the optical axis E. In this way, when the projector using the projection lens 100 of the embodiment is placed on a table, the image I produced by the projection of the projection lens 100 is still able to entirely present on the projection screen.

As shown in FIG. 1A, the projection lens 100 of the embodiment further includes an aperture stop 140 disposed between the twelfth lens G10 and the thirteenth lens G11. In addition, there is a cover glass 150 between the light valve 130 and the fourteenth lens G12 to protect the light valve 130.

In following, an embodiment of the projection lens 100 is given. It should be noted that the data listed in the following Table 1 is not used to limit the invention; anyone skilled in the art can refer the disclosure and is allowed to modify the parameter or setting, which still falls in the scope of the invention.

TABLE 1

| Surface | Curvature radius (mm) | Thickness (mm) | Refractive index | Abbe number | Note |
|---|---|---|---|---|---|
| S1 | −125.41 | 45.2 | | | Reflection mirror |
| S2 | 62.49 | 6 | 1.53 | 55.95 | First lens |
| S3 | 16.69 | 17.1 | | | |
| S4 | 19.7 | 4 | 1.53 | 55.95 | Second lens |
| S5 | 16.93 | 10.7 | | | |
| S6 | 28.9 | 5 | 1.81 | 25.36 | Third lens |
| S7 | 19.42 | 13 | | | |
| S8 | −42.85 | 2.4 | 1.78 | 26.1 | Fourth lens |

TABLE 1-continued

| Surface | Curvature radius (mm) | Thickness (mm) | Refractive index | Abbe number | Note |
|---|---|---|---|---|---|
| S9 | 37.59 | 7.4 | | | |
| S10 | 126.02 | 2.2 | 1.79 | 44.05 | Fifth lens |
| S11 | 65.65 | 0.3 | | | |
| S12 | 70.44 | 10.4 | 1.81 | 25.36 | Sixth lens |
| S13 | −51.69 | 0.2 | | | |
| S14 | 42.31 | 10.6 | 1.54 | 47.23 | Seventh lens |
| S15 | −238.46 | 12.9 | | | |
| S16 | 30.38 | 5 | 1.83 | 37.3 | Eighth lens |
| S17 | 16.4 | 1.5 | | | |
| S18 | 14.98 | 10 | 1.49 | 70.41 | Ninth lens |
| S19 | −173.23 | 0.2 | | | |
| S20 | 24.31 | 7.8 | 1.49 | 70.41 | Tenth lens |
| S21 | −13.91 | 1.2 | 1.83 | 37.3 | Eleventh lens |
| S22 | 11.39 | 5.2 | 1.49 | 70.41 | Twelfth lens |
| S23 | −16.17 | 0.2 | | | |
| S24 | −83.06 | 5.7 | 1.52 | 58.9 | Thirteenth lens |
| S25 | −6.83 | 1.2 | 1.5 | 81.61 | Fourteenth lens |
| S26 | −26.26 | | | | |

In Table 1, the thickness means the straight distance between two adjacent surfaces along the optical axis E. For example, the thickness of the surface S1 is the straight distance between the surface S1 and the surface S2 along the optical axis E. The lenses in the column Note have the corresponding thickness, refractive indexes and Abbe numbers referring to the corresponding row, wherein the thickness are respectively the thicknesses of the lenses.

In Table 1, the surface S1 is a surface of the reflection mirror M1 facing the minified side and is a reflective surface of the reflection mirror M1; the surfaces S2 and S3 are two surfaces of the first lens A1; the surfaces S4 and S5 are two surfaces of the second lens A2; the surfaces S6 and S7 are two surfaces of the third lens G1; the surfaces S8 and S9 are two surfaces of the fourth lens G2; the surfaces S10 and S11 are two surfaces of the fifth lens G3; the surfaces S12 and S13 are two surfaces of the sixth lens G4; the surfaces S14 and S15 are two surfaces of the seventh lens G5.

The surfaces S16 and S17 are two surfaces of the eighth lens G6; the surfaces S18 and S19 are two surfaces of the ninth lens G7; the surface S20 is a surface of the tenth lens G8 facing the magnified side; the surface S21 is a surface of the tenth lens G8 to join the eleventh lens G9, the surface S22 is a surface of the eleventh lens G9 to join the twelfth lens G10; the surface S23 is a surface of the twelfth lens G10 facing the minified side.

The surface S24 is a surface of the thirteenth lens G11 facing the magnified side; the surface S25 is a surface of the thirteenth lens G11 to join the fourteenth lens G12; the surface S26 is a surface of the fourteenth lens G12 facing the minified side. The curvature radiuses and thicknesses can refer to Table 1, which is omitted to describe.

The above-mentioned surface S1 is an odd-aspheric surface and expressed by:

$$Z = \frac{cy^2}{1 + \sqrt{1-(1+K)c^2y^2}} + A_1 y^1 + A_2 y^2 + A_3 y^3 + A_4 y^4 + A_5 y^5 + A_6 y^6 + A_7 y^7 + A_8 y^8 + A_9 y^9 + A_{10} y^{10} + A_{11} y^{11} + A_{12} y^{12}$$

wherein Z is the sag along the optical axis direction, c is the reciprocal of the radius of the osculating sphere, i.e., the reciprocal of the curvature radius approaching the optical axis E (the curvature radius of the surface S1 in Table 1), K is quadratic conic-surface coefficient, y is aspheric height, i.e., the height from the lens center to the lens margin, and $A_1, A_2, A_3, A_4, A_5, \ldots, A_{12}$ are aspheric coefficients. Table 2 gives the parameters of the surface S1.

TABLE 2

| Aspheric parameter | Quadratic conic-surface coefficient K | Coefficient $A_1$ | Coefficient $A_2$ | Coefficient $A_3$ | Coefficient $A_4$ | Coefficient $A_5$ | Coefficient $A_6$ |
|---|---|---|---|---|---|---|---|
| S1 | −6.51314 | −5.46607 E−04 | −3.95919 E−05 | −1.33699 E−6 | −1.64134 E−8 | 1.1728 E−12 | 3.37713 E−13 |

| Aspheric parameter | Quadratic conic-surface coefficient K | Coefficient $A_7$ | Coefficient $A_8$ | Coefficient $A_9$ | Coefficient $A_{10}$ | Coefficient $A_{11}$ | Coefficient $A_{12}$ |
|---|---|---|---|---|---|---|---|
| S1 | −6.51314 | 1.60202 E−15 | 1.20615 E−17 | 2.95215 E−20 | −3.80176 E−22 | −2.15072 E−24 | −1.55208 E−26 |

The surfaces S2 and S3 of the first lens A1 and the surfaces S4 and S5 of the second lens are even-aspheric surfaces, which are expressed by:

$$Z = \frac{cy^2}{1 + \sqrt{1-(1+K)c^2y^2}} + A_1 y^4 + A_2 y^6 + A_3 y^8 + A_4 y^{10} + A_5 y^{12} + A_6 y^{14}$$

wherein Z is the sag along the optical axis direction, c is the reciprocal of the radius of the osculating sphere, i.e., the reciprocal of the curvature radius approaching the optical axis E (the curvature radiuses of the surfaces S2, S3, S4 and S5 in Table 2), K is quadratic conic-surface coefficient, y is aspheric height, and $A_1, A_2, A_3, A_4, A_5, A_6$ are aspheric coefficients. Table 3 gives the parameters of the surfaces S2, S3, S4 and S5.

TABLE 3

| Aspheric parameter | Quadratic conic-surface coefficient K | Coefficient $A_1$ | Coefficient $A_2$ | Coefficient $A_3$ | Coefficient $A_4$ | Coefficient $A_5$ | Coefficient $A_6$ |
|---|---|---|---|---|---|---|---|
| S2 | 1.17983 | −2.15262 E−06 | 2.21777 E−09 | −1.19483 E−12 | 1.6026 E−16 | 1.03614 E−19 | −4.73453 E−23 |
| S3 | −7.69732 E−01 | 2.48385 E−05 | −1.09022 E−8 | 3.42654 E−12 | 2.59956 E−16 | −3.15288 E−19 | 3.97712 E−22 |
| S4 | −1.26196 | −1.34132 E−05 | 3.16881 E−08 | −2.98645 E−11 | 1.52637 E−14 | −6.77016 E−18 | 8.7049 E−21 |
| S5 | −6.8094 E−01 | −2.30348 E−05 | −2.24346 E−08 | 1.1811 E−10 | 5.02901 E−14 | −5.69526 E−17 | −5.8912 E−20 |

It can be seen that in the embodiment the reflection mirror M1, the first lens A1 and the second lens A2 are aspheric lenses, so that the coma, the astigmatism or the distortion of the projection lens 100 are effectively reduced. In the embodiment, the optimal range of the effective focal length is between 4.3 mm-4.5 mm, which the invention is not limited to; the numerical aperture F# is 2.7; the angle of view (AOV) (2ω) is 140°-140.4°. In addition, the effective focal length (EFL) of the reflection mirror M1 is, for example, −60.49 mm.

On the other hand, the fixed-focus lens 100 of the embodiment satisfies F/H>0.23, wherein F is an effective focal length of the fixed-focus lens 100 and H is an image height (the image height H is (C+D), as shown above). When F/H>0.839, the AOV (2ω) of the fixed-focus lens 100 is less than 100° and at the time, the projection angle is not broader so that even the reflection mirror M1 of the embodiment is not an aspheric lens, the imaging quality is still not affected. However, when F/H<0.23, the AOV (2ω) of the fixed-focus lens 100 is greater than 154.1°, so that it needs to add aspheric lenses and other lenses to compensate the aberration.

Continuing to FIG. 1A, in the first lens group 122 of the embodiment, the first lens A1, the second lens A2 and the third lens G1 are respectively a convex-concave lens with a convex surface towards the magnified side, and the fourth lens G2 is a double-concave lens. The fifth lens G3 is a convex-concave lens with a convex surface towards the magnified side; the sixth lens G4 and the seventh lens G5 are respectively a double-convex lens; the third lens G1, the fourth lens G2, the fifth lens G3, the sixth lens G4 and the seventh lens G5 are, for example, respectively a spherical lens. In the embodiment, the effective focal length of the first lens group 122 is, for example, 110.26 mm.

In the second lens group 124 of the embodiment, the eighth lens G6 is a convex-concave lens with a convex surface towards the magnified side; the ninth lens G7 is a double-convex lens; the tenth lens G8 is a double-convex lens; the eleventh lens G9 is a double-concave lens; the twelfth lens G10 is a double-convex lens; the thirteenth lens G11 is a concave-convex lens with a concave surface towards the magnified side; the fourteenth lens G12 is a convex-concave lens with a concave surface towards the magnified side. In the second lens group 124, the tenth lens G8, the eleventh lens G9 and the twelfth lens G10 comprise a triple cemented lens, and the thirteenth lens G11 and the fourteenth lens G12 comprise a double cemented lens. In this way, the spherical aberration and the color aberration of the fixed-focus lens 100 can be effectively reduced. Besides, the lenses of the second lens group 124 are, for example, spherical lenses. The EFL of the second lens group 124 is, for example, 40.54 mm.

Figure 2A:
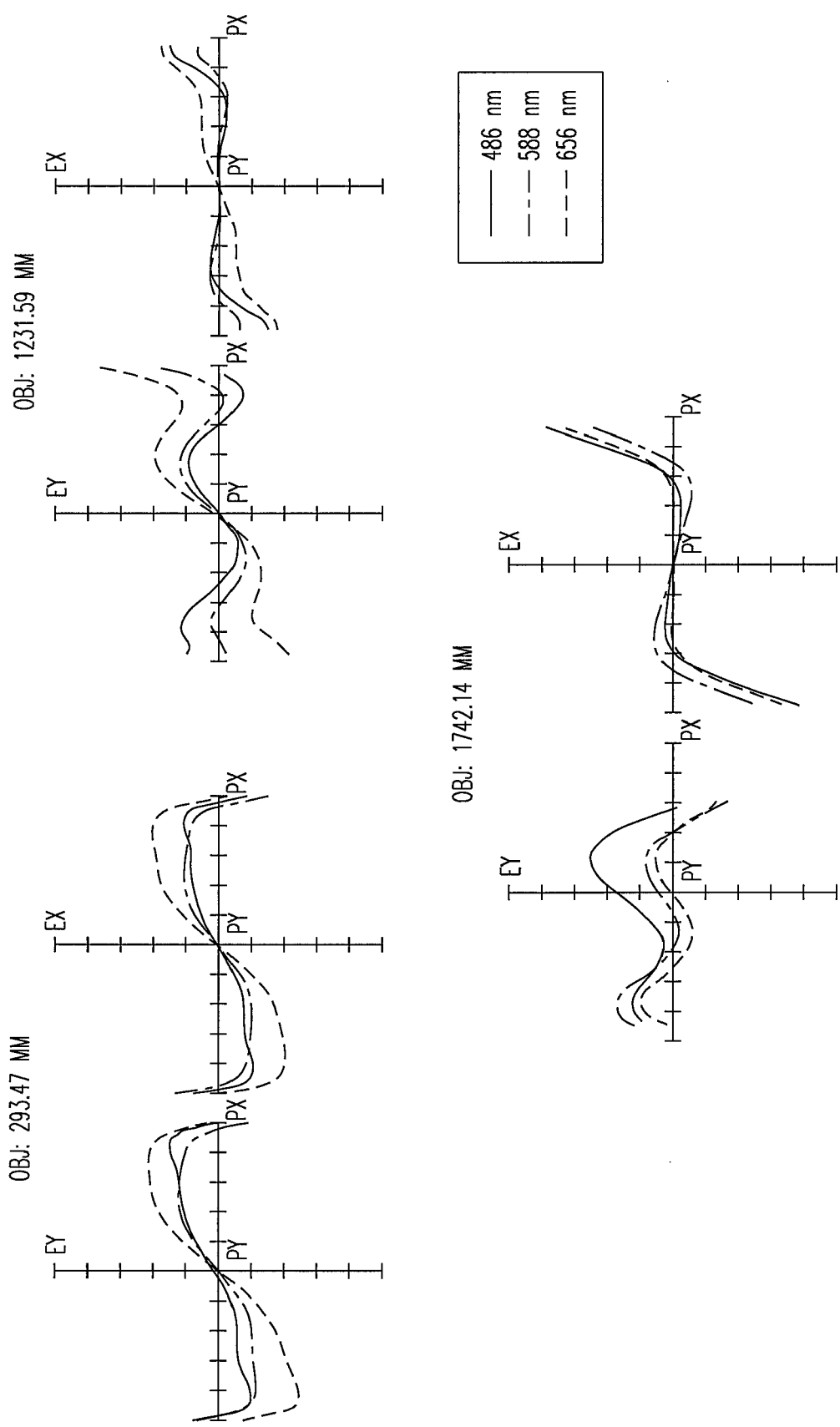
FIGS. 2A-2C are imaging optical simulation data plots of the fixed-focus lens of FIG. 1A.
Figure 2B:
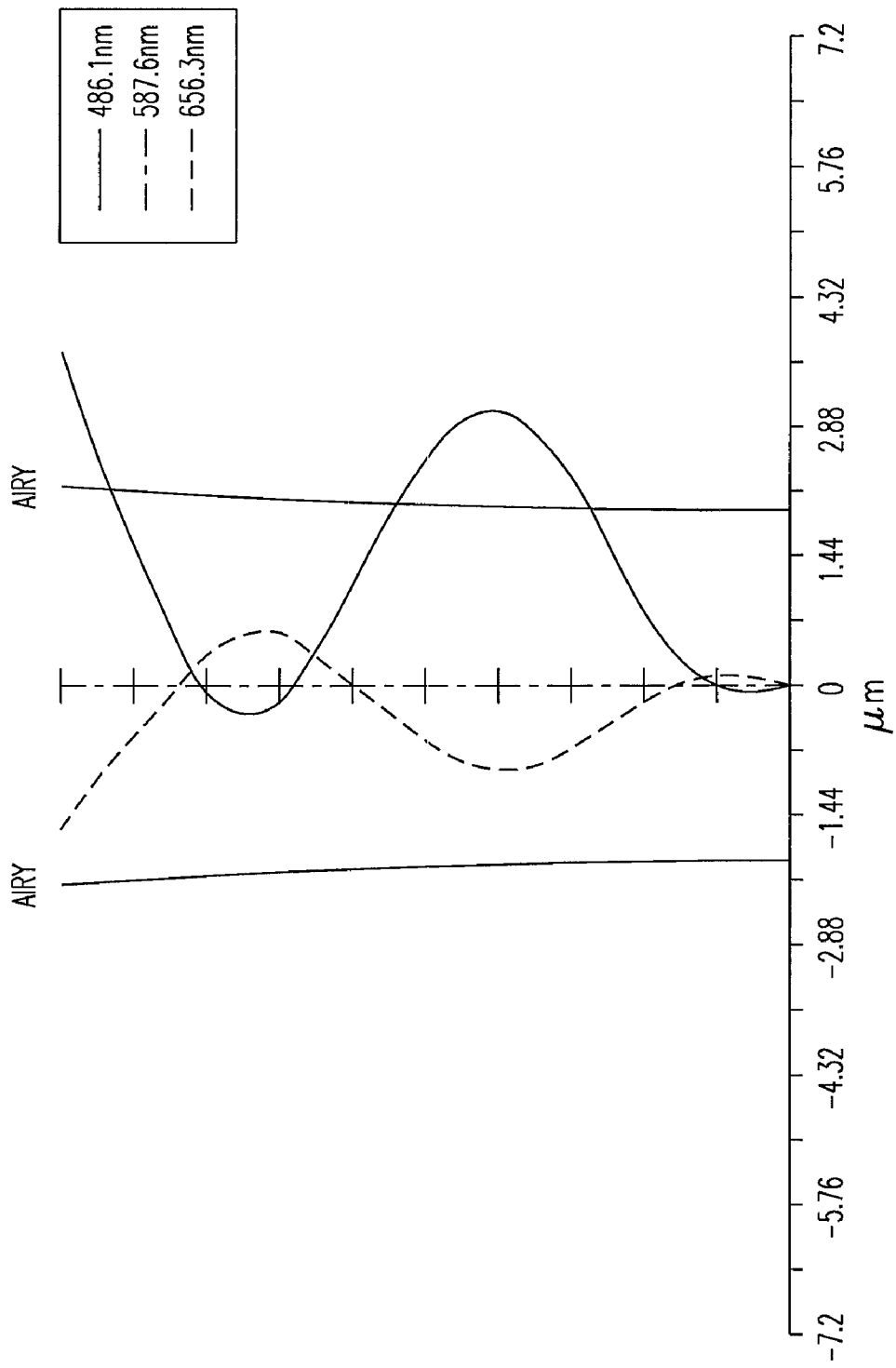
Figure 2C:
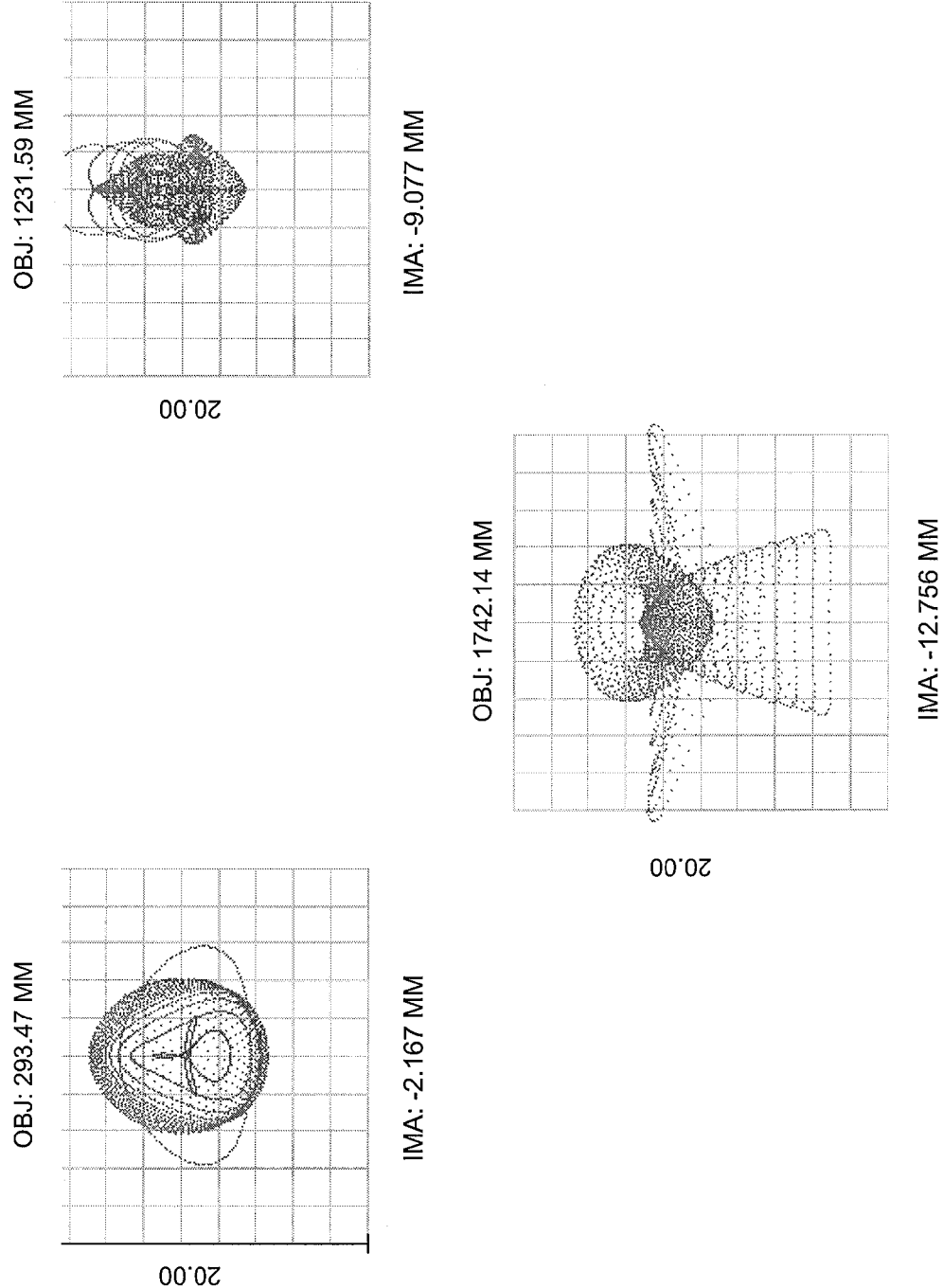

FIGS. 2A-2C are imaging optical simulation data plots of the fixed-focus lens 100 of FIG. 1A. The simulation is conducted on three reference waveband of a red light (wavelength 656 nm), a green light (wavelength 588 nm) and a blue light (wavelength 486 nm). Referring to FIGS. 2A-2C, FIG. 2A herein is a transverse ray fan plot, wherein x axis represents the position where the light passes through the aperture stop 140 and y axis represents the position where the light strikes onto the image plane (for example, the light valve 130). The upper-left diagram is the transverse ray fan plot when the field is zero, the upper-right diagram is the transverse ray fan plot when the field is 0.7, and the lower diagram is the transverse ray fan plot when the field is 1.

FIG. 2B is a lateral color diagram, wherein the abscissa represents the distance between the intersecting point on the imaging plane by the primary lights of three wavelengths and the intersecting point on the imaging plane by the primary light of the central wavelength; the ordinate represents field radius. FIG. 2C is a spot diagram showing the different light spot sizes when different points are projected onto the projection screen (not shown). The figures given by FIGS. 2A-2C are within the range of the standard, which means the fixed-focus lens 100 of the embodiment has a better imaging quality.

In summary, the embodiment of the invention has at least one of the following advantages or functions. In the embodiment of the invention, in the lens group of the projection lens it includes 14 lenses so that, in comparison with the conventional lens, the projection lens of the invention is able to reduce the lens number to simplify the mechanism design. In addition, the reflection mirror, the first lens and the second lens in the embodiment of the invention are aspheric reflection mirror and the aspheric lenses, so that it can effectively reduce the distortion of the fixed-focus lens, and the rest lenses can be spherical lenses which is advantageous in effectively reducing the production cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A fixed-focus lens, disposed between a magnified side and a minified side and having an optical axis; the fixed-focus lens comprising:
   a reflective system, disposed between the magnified side and the minified side, wherein the reflective system comprises a reflection mirror having a negative refractive power; and
   a refractive system, disposed between the reflection mirror and the minified side and comprising:
      a first lens group, having a positive refractive power; and
      a second lens group, disposed between the first lens group and the minified side and having a positive refractive power,
      wherein the fixed-focus lens satisfies $F/H > 0.23$, where F is an effective focal length and H is an image height.

2. The fixed-focus lens as claimed in claim 1, wherein the fixed-focus lens satisfies $(C+D)/C \geq 1$, where C is a length of an image at the magnified side and D is a distance between the image and the optical axis.

3. The fixed-focus lens as claimed in claim 1, wherein the first lens group comprises seven lenses which are sequentially arranged from the magnified side towards the minified side as a first lens, a second lens, a third lens, a fourth lens, a fifth lens, a sixth lens and a seventh lens, and the lenses of the first lens group from the magnified side towards the minified side have sequentially negative, negative, negative, negative, negative, positive and positive refractive powers.

4. The fixed-focus lens as claimed in claim 1, wherein the second lens group comprises seven lenses sequentially arranged from the magnified side towards the minified side as an eighth lens, a ninth lens, a tenth lens, an eleventh lens, a twelfth lens, a thirteenth lens and a fourteenth lens, and the lenses of the second lens group from the magnified side towards the minified side have sequentially negative, positive, positive, negative, positive, positive and negative refractive powers.

5. The fixed-focus lens as claimed in claim 1, wherein a position of the second lens group in the fixed-focus lens keeps fixed, and the first lens group moves in relation to the second lens group for focusing.

6. The fixed-focus lens as claimed in claim 1, wherein the reflection mirror is an aspheric reflection mirror.

7. The fixed-focus lens as claimed in claim 3, wherein the first lens and the second lens are aspheric lenses.

8. The fixed-focus lens as claimed in claim 3, wherein the third lens, the fourth lens, the fifth lens, the sixth lens and the seventh lens are spherical lenses.

9. The fixed-focus lens as claimed in claim 4, wherein the lenses of the second lens group are spherical lenses.

10. The fixed-focus lens as claimed in claim 4, wherein the tenth lens, the eleventh lens and the twelfth lens comprise a triple cemented lens.

11. The fixed-focus lens as claimed in claim 4, wherein the thirteenth lens and the fourteenth lens comprise a double cemented lens.

12. The fixed-focus lens as claimed in claim 3, wherein the first lens, the second lens and the third lens are convex-concave lenses with convex surfaces towards the magnified side, and the fourth lens is a double-concave lens.

13. The fixed-focus lens as claimed in claim 3, wherein the fifth lens is a convex-concave lens with a convex surface towards the magnified side, and the sixth lens and the seventh lens are double-convex lenses.

14. The fixed-focus lens as claimed in claim 4, wherein the eighth lens is a convex-concave lens with a convex surface towards the magnified side and the ninth lens is a double-convex lens.

15. The fixed-focus lens as claimed in claim 4, wherein the tenth lens is a double-convex lens, the eleventh lens is a double-concave lens and the twelfth lens is a double-convex lens.

16. The fixed-focus lens as claimed in claim 4, wherein the thirteenth lens is a concave-convex lens with a concave surface towards the magnified side and the fourteenth lens is a convex-concave lens with the concave surface towards the magnified side.

17. The fixed-focus lens as claimed in claim 4, further comprising an aperture stop located between the twelfth lens and the thirteenth lens.

18. The fixed-focus lens as claimed in claim 1, wherein the effective focal length of the fixed-focus lens ranges between 4.3 mm and 4.5 mm.

* * * * *